INVENTOR
HOWARD E. MAYNARD.
BY
ATTORNEY

Patented June 17, 1930

1,764,847

UNITED STATES PATENT OFFICE

HOWARD E. MAYNARD, OF DETROIT, MICHIGAN, ASSIGNOR TO CHRYSLER CORPORATION, OF DETROIT, MICHIGAN, A CORPORATION OF DELAWARE

BRAKE SHOE

Application filed May 23, 1928. Serial No. 279,893.

This invention relates to brake shoes, and is illustrated as embodied in novel pressed metal shoes for an internal expanding automobile brake.

An object of the invention is to increase the strength of the brake shoes, and especially to do so in a manner permitting them to be made more cheaply, as for example from sheet metal stampings.

Having this object in mind, an important feature of the invention relates to forming the brake shoe with a body generally T shaped in section, preferably formed from angle members welded together. One flange of each angle member is cylindrical and forms a part of the friction lining support and the other adjacent flanges of the angle members form the stiffening web.

Another object of the invention is to provide stamped out portions in the stiffening web to strengthen it. The stamped out portions are shown in the form of adjacent grooves which when put together form a cylindrical rib.

A further object of the invention is to provide tubular flanges on one of the flanges forming the stiffening web which are received in openings in the other flange of the stiffening web. This is particularly desirable for assembling the two angle members for welding.

Other objects and features of the invention including various desirable details of construction will be apparent from the following description of one illustrative embodiment shown in the accompanying drawings, in which.

Figure 1:
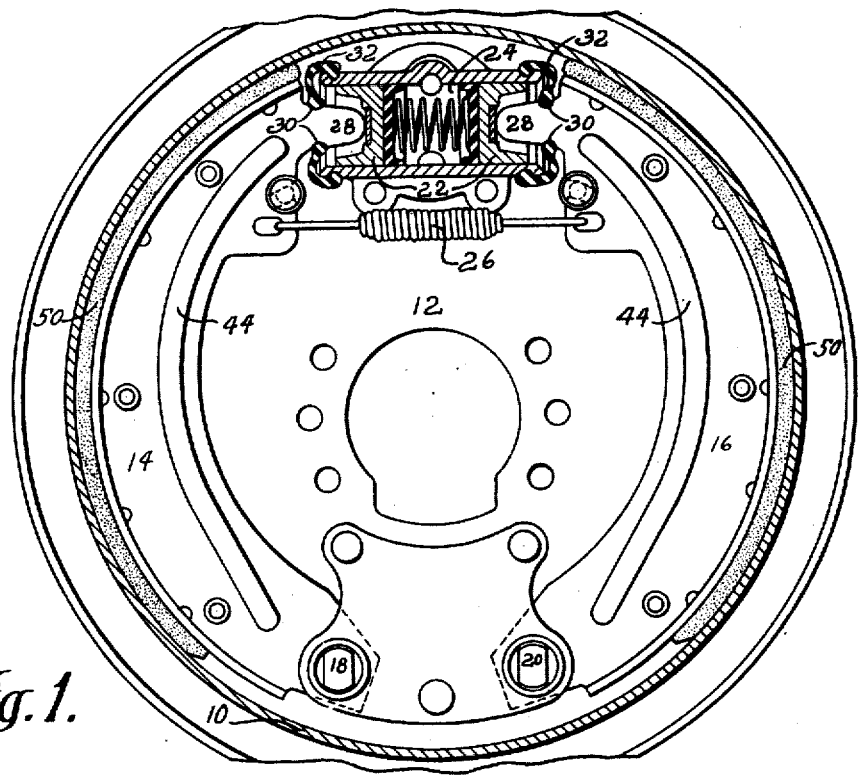
Fig. 1 is a vertical section through the brake just inside the head of the drum, showing the shoes in side elevation and the operating mechanism in section.
Figure 2:
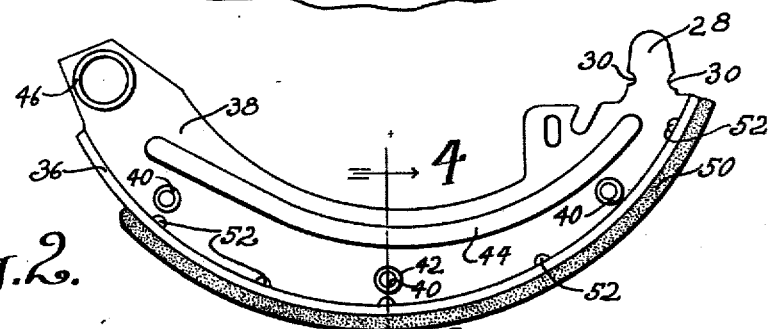
Fig. 2 is a side elevation of one of the brake shoes.
Figure 3:
Fig. 3 is a plan view of the brake shoe shown in Fig. 2.
Figure 4:
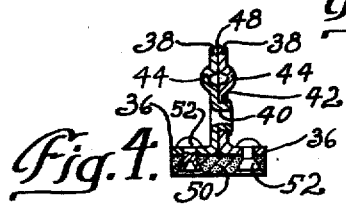
Fig. 4 is a sectional view on line 4—4 of Fig. 2.

The brake illustrated comprises a drum 10, at the open side of which is a backing plate 12 and within the drum 10 are two brake shoes 14 and 16. The shoe 14 is pivoted as at 18 on the plate 12 and the other shoe 16 is pivoted as at 20.

The control for the shoes shown is of the hydraulic type operating by means such as a pair of oppositely movable pistons 22 reciprocating in a cylinder 24. The ends of the shoes, opposite their pivot points, engage the pistons 22. The brake is applied by applying a fluid pressure in the cylinder 24 between the two pistons so that movement of the pistons forces the shoes 14 and 16 against the drum 10 against the resistance of a spring 26. The free ends of the shoes 14 and 16 are provided with piston engaging end portions 28 and grooves 30; the latter receiving flexible covers 32, enclosing the open ends of the cylinder 24.

The general construction of each brake shoe consists of a pair of angle members 34 each having a cylindrical lateral flange 36 and a radial flange 38. The angle members are formed cylindrical to fit the inner periphery of the brake drum.

The radial flange 38 on one of the angle members is provided with a plurality of tubular flanges 40 adapted to be received in openings 42 in the other angle member. Each flange 38 is also provided with a stamped out portion 44 in the form of a groove. These grooves have been so arranged that when the angle members are put together the grooves coincide forming a cylindrical channel approximately the entire length of the cylindrical flanges 36 and which extend generally in a direction with the cylindrical flanges 36.

The opposite ends of radial flanges are each extended beyond the ends of the cylindrical flanges; the one end provided with oppositely extended tubular flanges 46 to form a bearing for the pivot at 18 or 20 and the other end provided with the grooves 30 and piston engaging portion 28.

It will be understood that the two angle members are placed back to back with the tubular flanges 40 in the openings 42. The flanges 40 in the openings 42 align the two angle members and hold them with relation to each other for the welding operation.

The assembly is then electrically welded at its outer edges as at 48. A brake lining 50 is secured as by rivets 52 to the flanges 36.

Stamped angle members assembled in such a manner provide a strong and light weight shoe which may be readily assembled.

It will be obvious that various changes including the size and arrangement of parts may be made without departing from the spirit of my invention and it is not my intention to limit its scope other than by the terms of the appended claims.

What I claim is:

1. A brake shoe comprising a pair of angle members each having a cylindrical flange and a radial flange, tubular flanges on one of said radial flanges adapted to be received in openings in the other of said radial flanges, and a stamped out portion on each of said radial flanges forming a groove, said groove extending approximately the full length of said cylindrical flanges, one to coincide with the other when the radial flanges are secured together.

2. A brake shoe comprising a pair of angle members each having a cylindrical flange and a radial flange at one edge of said cylindrical flange, and tubular flanges on one of said radial flanges adapted to be received in openings in the other of said radial flanges, said radial flanges being electrically welded together.

3. A brake shoe comprising a pair of angle members each having a cylindrical flange and a radial flange at one edge of said cylindrical flange, and a portion on each radial flange stamped out of the plane of radial flange in the direction of the cylindrical flange and extending approximately the length of said cylindrical flange, the ends of said radial flanges projecting beyond the ends of said cylindrical flanges.

4. A brake shoe comprising a pair of angle members each having a cylindrical flange and a radial flange at one edge of said cylindrical flange, and a cylindrical rib formed by uniting the two angle members each having a portion of the cylindrical rib stamped thereon, said cylindrical rib extending approximately the full length of said shoe.

5. A brake shoe comprising a pair of angle members each having a cylindrical flange and a radial flange at one edge of said cylindrical flange, and tubular flanges on one of said radial flanges extending in a direction opposite to said cylindrical flange and adapted to be received in openings in the other of said radial flanges, said radial flanges being welded together.

HOWARD E. MAYNARD.